United States Patent
Ghabchi et al.

(10) Patent No.: US 11,666,968 B2
(45) Date of Patent: Jun. 6, 2023

(54) MICROSTRUCTURE REFINEMENT METHODS BY MELT POOL STIRRING FOR ADDITIVE MANUFACTURED MATERIALS

(71) Applicant: The Boeing Company, Chicago, IL (US)

(72) Inventors: Arash Ghabchi, Chicago, IL (US); Christopher A. Meyer, Chicago, IL (US); James D. Cotton, Chicago, IL (US); Matthew J. Crill, Chicago, IL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/574,155

(22) Filed: Jan. 12, 2022

(65) Prior Publication Data

US 2022/0134427 A1 May 5, 2022

Related U.S. Application Data

(62) Division of application No. 15/827,153, filed on Nov. 30, 2017, now Pat. No. 11,278,963.

(51) Int. Cl.
*B22F 7/00* (2006.01)
*B33Y 30/00* (2015.01)
(Continued)

(52) U.S. Cl.
CPC ................ *B22F 7/002* (2013.01); *B22F 3/24* (2013.01); *B22F 10/20* (2021.01); *B22F 12/41* (2021.01);
(Continued)

(58) Field of Classification Search
None
See application file for complete search history.

(56) References Cited

U.S. PATENT DOCUMENTS

2015/0064047 A1 3/2015 Hyde et al.

FOREIGN PATENT DOCUMENTS

CN 102240861 A 11/2011
CN 102 460 861 7/2013
(Continued)

OTHER PUBLICATIONS

Gibson, Ian, et al. Additive Manufacturing Technologies: Rapid Prototyping to Direct Digital Manufacturing. Springer, 2010. (Year: 2010).*

(Continued)

*Primary Examiner* — Anthony M Liang
(74) *Attorney, Agent, or Firm* — McDonnell Boehnen Hulbert & Berghoff LLP

(57) ABSTRACT

Examples for refining the microstructure of metallic materials used for additive manufacturing are described herein. An example can involve generating a first layer of an integral object by heating a metallic material to a molten state such that the metallic material includes a solid-liquid interface. The example can further involve applying an electromagnetic field or vibrations to the metallic material of the first layer. In some instances, the electromagnetic fields or vibrations perturb the first layer of metallic material causing nucleation sites to form at the solid-liquid interface of the metallic material in the molten state. The example also includes generating a second layer coupled to the first layer of the integral object. Generating the second layer increases a number of nucleation sites at the solid-liquid interface of the metallic material in the molten state. Each nucleation site can grows a crystal at a spatially-random orientation.

20 Claims, 6 Drawing Sheets

(51) Int. Cl.

| | | |
|---|---|---|
| *B23K 26/342* | (2014.01) | |
| *B22F 10/20* | (2021.01) | |
| *B33Y 10/00* | (2015.01) | |
| *B23P 9/00* | (2006.01) | |
| *B22F 3/24* | (2006.01) | |
| *B22F 10/30* | (2021.01) | |
| *B33Y 70/00* | (2020.01) | |
| *B22F 12/41* | (2021.01) | |
| *B22F 12/88* | (2021.01) | |
| *B22F 12/20* | (2021.01) | |

(52) U.S. Cl.
CPC .......... *B22F 12/88* (2021.01); *B23K 26/342* (2015.10); *B23P 9/00* (2013.01); *B33Y 10/00* (2014.12); *B33Y 30/00* (2014.12); *B33Y 70/00* (2014.12); *B22F 12/20* (2021.01); *B22F 2003/248* (2013.01); *B22F 2999/00* (2013.01)

(56) References Cited

FOREIGN PATENT DOCUMENTS

| | | |
|---|---|---|
| CN | 105 798 299 | 7/2016 |
| CN | 105798299 B | 7/2016 |
| EP | 176942 A1 | 4/1986 |
| EP | 2 891 533 | 7/2015 |
| EP | 2891533 B | 7/2015 |
| EP | 3 038 771 | 7/2016 |
| JP | 2016-535170 A | 11/2016 |
| RU | 2359797 C2 | 6/2009 |
| RU | 2617077 C2 | 4/2017 |
| RU | 2618287 C2 | 5/2017 |
| WO | 2015/028065 A | 3/2015 |
| WO | WO 2017/097252 | 6/2017 |

OTHER PUBLICATIONS

Office Action of the Substantive Examination issued by the Russian Patent Office in application No. 2018135646/05 dated Dec. 20, 2021.

Huang Wei-Chin et al., "Microstructure-controllable Laser Additive Manufacturing Process for Metal Products". Physics Procedia, Elsevier, Amsterdam, NL, vol. 56, Sep. 9, 2014, pp. 58-63.

Communication pursuant to Article 94(3) EPC prepared by the European Patent Office in application No. EP 18 198 960.9 dated Mar. 2, 2020.

Summons to attend oral proceedings pursuant to Rule 115(1) EPC prepared by the European Patent Office in application No. EP 18 198 960.9 dated Nov. 26, 2020.

Donoghue, Jack et al., "Integration of Deformation Processing with Additive Manufacture of Ti-6Al-4V Components for Improved β Grain Structure and Texture." TMS2015 Annual Meeting Supplemental Proceedings, TMS (The Minerals, Metals & Materials Scoiety), 2015, 8 pages.

Martina, Filomeno et al., "Microstructure of Interpass Rolled Wire + Arc Additive Manufacturing Ti-6Al-4V Components," Metallurical and Materials Transactions A, vol. 46A, Dec. 2015, 16 pages.

Donoghue, J. et al., "The Effectiveness of Combining Rolling Deformation with Wire-Arc Additive Manufacture on β-grain Refinement and Texture Modification in Ti-6Al-4V," Materials Characterization 114 (2016,12 pages.

Kou, Sindo, "Welding Metallurgy, Second Edition,"Wiley-Interscience, A John Wiley & Sons, Inc., Publication, Copyright 2003, 466 pages.

Notice of Reasons for Rejection issued by the Japanese Patent Office in application No. 2018-221195 dated Nov. 29, 2022.

\* cited by examiner

100

GENERATE A FIRST LAYER OF AN INTEGRAL OBJECT USING A METALLIC MATERIAL, WHEREIN THE INTEGRAL OBJECT INCLUDES ONE OR MORE INTERCONNECTED COMPONENTS, AND WHEREIN THE FIRST LAYER IS GENERATED BY HEATING THE METALLIC MATERIAL TO A MOLTEN STATE SUCH THAT THE METALLIC MATERIAL INCLUDES A SOLID-LIQUID INTERFACE — 102

APPLYING AN ELECTROMAGNETIC FIELD TO THE METALLIC MATERIAL OF THE FIRST LAYER, WHEREIN THE ELECTROMAGNETIC FIELD PERTURBS THE FIRST LAYER CAUSING ONE OR MORE NUCLEATION SITES TO FORM AT THE SOLID-LIQUID INTERFACE OF THE METALLIC MATERIAL IN THE MOLTEN STATE — 104

GENERATING A SECOND LAYER COUPLED TO THE FIRST LAYER OF THE INTEGRAL OBJECT, WHEREIN GENERATING THE SECOND LAYER INCREASES A NUMBER OF NUCLEATION SITES AT THE SOLID-LIQUID INTERFACE OF THE METALLIC MATERIAL IN THE MOLTEN STATE, AND WHEREIN EACH NUCLEATION SITE GROWS A CRYSTAL AT A SPATIALLY-RANDOM ORIENTATION — 106

FIG. 1

APPLYING VIBRATION TO THE METALLIC MATERIAL OF THE FIRST LAYER, WHEREIN THE VIBRATION CAUSES A RELATIVE SHEAR MOTION OF THE METALLIC MATERIAL IN THE MOLTEN STATE — 108

FIG. 2

APPLYING A COOLING GAS FLOW TO THE METALLIC MATERIAL OF THE FIRST LAYER, WHEREIN THE COOLING GAS REDUCES AN AMOUNT OF TIME AVAILABLE FOR DENDRITES OF THE METALLIC MATERIAL TO GROW —110

FIG. 3

APPLYING AN ELECTROMAGNETIC FIELD TO A METALLIC MATERIAL OF THE SECOND LAYER, WHEREIN THE METALLIC MATERIAL OF THE SECOND LAYER IS IN A MOLTEN STATE —112

GENERATING A THIRD LAYER OF THE INTEGRAL OBJECT, WHEREIN THE THIRD LAYER IS COUPLED TO THE SECOND LAYER —114

FIG. 4

MICROSTRUCTURE REFINEMENT METHODS BY MELT POOL STIRRING FOR ADDITIVE MANUFACTURED MATERIALS

CROSS-REFERENCE TO RELATED APPLICATION

The present patent application is a divisional of U.S. patent application Ser. No. 15/827,153, filed on Nov. 30, 2017, the entire contents of which is hereby incorporated by reference.

FIELD

The present disclosure relates generally to additive manufacturing processes, and more particularly, to techniques for refining the microstructure of metallic materials used for additive manufacturing.

BACKGROUND

Unlike traditional manufacturing that relies on subtractive techniques (e.g., cutting, drilling) to remove material from bulk shapes to arrive at a final shape, additive manufacturing builds shapes through precisely adding and consolidating layers of material according to a three-dimensional (3D) digital model. Depending on the underlying material used, various consolidation techniques are available to additively manufacture a desired structure, such as powder bed fusion, direct energy deposition (welding, electron-beam and laser processing), photo-polymerization, material jetting, binder jetting, and extrusion.

Additive manufacturing is often used to create functional prototypes or components out of polymeric materials. Plastics, rubbers, and other polymeric materials are typically used since consolidation techniques for forming and blending layers of these materials together are economical and readily available. Conversely, metallurgical challenges associated with consolidating layers of metallic materials (e.g., metals, alloys, compounds) often reduce or even prevent their use for additive manufacturing. As a result, additive manufacturing typically only uses metallic materials to produce highly specialized components for medical, aviation, or other unique purposes.

One reason that consolidation techniques are difficult for a metallic material is the underlying microstructure of the material. In particular, metals and alloys consist of a large number of irregularly shaped grains. Although indiscernible to the naked eye, the sizes and arrangement of the grains impact the material's properties, including its strength, ductility, strain rate, fatigue durability, and resistance to creep deformation, among other properties.

When the layer of metallic material completely solidifies during additive manufacturing, the microstructure of the resulting material has more anisotropic properties that impact the durability, strength and other properties of the layer. Since additive manufacturing involves generating a structure through a layer by layer process, the anisotropic properties are often compounded due inconsistent dendritic growth that varies layer to layer.

One technique currently used to reduce anisotropic properties in deposited layers involves applying a rolling wheel upon each layer prior to adding the subsequent layer. Although the rolling wheel technique can promote grain restructuring within deposited layers, the size and space required to use the rolling wheel limits its overall use to additively manufacturing processes depositing material with thicker features and simple geometrical shapes. Therefore, there is a need for technology that can refine the microstructure of a deposited layer of metallic material during additive manufacturing that can accommodate structures with various types of designs.

SUMMARY

In one example, a method is described. The method includes generating a first layer of an integral object using a metallic material. The integral object includes one or more interconnected components, and the first layer is generated by heating the metallic material to a molten state such that the metallic material includes a solid-liquid interface. The method further includes applying an electromagnetic field to the metallic material of the first layer. Particularly, the electromagnetic field perturbs the first layer of metallic material causing one or more nucleation sites to form at the solid-liquid interface of the metallic material in the molten state. The method also includes generating a second layer coupled to the first layer of the integral object. Generating the second layer increases a number of nucleation sites at the solid-liquid interface of the metallic material in the molten state. In some instances, each nucleation site grows a crystal at a spatially-random orientation.

In another example, an apparatus is described. The apparatus comprises an integral object having one or more interconnected components. The integral object includes a first layer generated using a metallic material. The first layer is generated by heating the metallic material to a molten state such that the metallic material includes a solid-liquid interface. An electromagnetic field is applied to perturb the first layer of metallic material causing one or more nucleation sites to form at the solid-liquid interface of the metallic material in the molten state. The integral object also includes a second layer coupled to the first layer of the integral object. Generating the second layer increase a number of the nucleation sites at the solid-liquid interface of the metallic material in the molten state. In some instances, each nucleation site grows a crystal at a spatially-random orientation.

In another example, a method is described. The method includes generating a first layer of an integral object using a metallic material. The integral object includes one or more interconnected components, and the first layer is generated by heating the metallic material to a molten state such that the metallic material includes a solid-liquid interface. The method further includes applying an electromagnetic field to the metallic material of the first layer. The electromagnetic field perturbs the first layer of metallic material causing one or more nucleation sites to form at the solid-liquid interface of the metallic material in the molten state. The method also includes applying vibration to the metallic material of the first layer. The vibration causes one or more dendrites growing in the metallic material in the molten state to fracture and detach resulting in an increase in a number of nucleation sites at the solid-liquid interface of the metallic material. The method also includes generating a second layer coupled to the first layer of the integral object. Particularly, generating the second layer increases the number of nucleation sites at the solid-liquid interface of the metallic material in the molten state. In some instances, each nucleation site grows a crystal at a spatially-random orientation.

The features, functions, and advantages that have been discussed can be achieved independently in various examples or can be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 1 shows a flowchart of an example method for refining the microstructure of a material used for additive manufacturing, according to an example implementation.

FIG. 2 shows a flowchart of an example method for use with the method shown in FIG. 1, according to an example implementation.

FIG. 3 shows a flowchart of another example method for use with the method shown in FIG. 1, according to an example implementation.

FIG. 4 shows a flowchart of a further example method for use with the method shown in FIG. 1, according to an example implementation.

DETAILED DESCRIPTION

Figure 5:
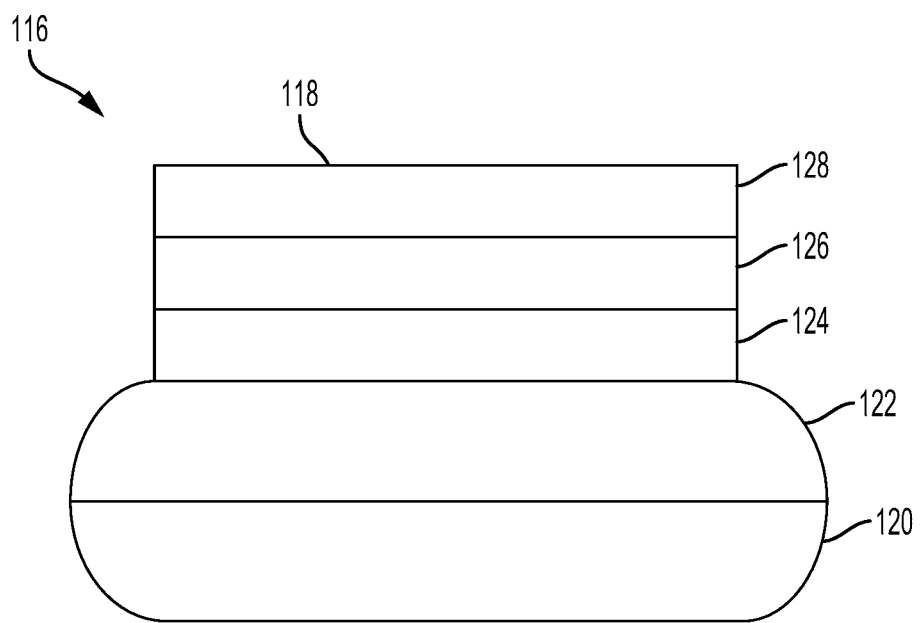
FIG. 5 is an illustration of an apparatus generated using microstructure refinement techniques during additive manufacturing, according to an example implementation.

Disclosed examples will now be described more fully hereinafter with reference to the accompanying drawings, in which some, but not all of the disclosed examples are shown. Indeed, several different examples can be described and should not be construed as limited to the examples set forth herein. Rather, these examples are described so that this disclosure will be thorough and complete and will fully convey the scope of the disclosure to those skilled in the art.

The examples relate to techniques for refining the microstructure of metallic material layers during additive manufacturing. Particularly, examples techniques perturb or otherwise modify a layer of metallic material when the material is in a molten state (i.e., melt pool). By using one or multiple techniques presented herein during additive manufacturing to refine the microstructure of a metallic material layer, the properties of the layer can be enhanced resulting in improvements to strength, ductility, fatigue, durability, strain rate, and resistance to creep deformation, among other properties.

The sizes and arrangement of grains within a material's microstructure typically depend on the formation conditions that influence dendritic growth of the metallic material. When a metallic material is manufactured by an additive process, it is melted and deposited as desired to form a layer of structure. The heat causes the metallic material to change into a locally molten state that enables the resulting product to be shaped into a particular form. Once enough heat leaves the molten material to drop the material below its melting point temperature, the material transitions back from the liquid, molten state to a solid state in a process called solidification.

During solidification, nucleation and growth transformation occurs within the metallic material. Nucleation involves clusters of atoms from the molten material bonding together and forming tiny seed crystals. The tiny seed crystals originate at locations in the material that are referred to herein as nucleation sites and continue to grow in the form of dendrites, which are tree-like structures made up of crystals. The formation of dendrites occurs because crystals grow into a thermal gradient termed a mushy zone consisting of both liquid and solid phases. In some instances, heterogeneous nucleation occurs during solidification with nucleation sites forming on impurity surfaces or particles, such as relative to the substrate or prior layer, insoluble detached impurities, or other structural materials that lower the critical free energy required for atoms to form stable nuclei crystals. The crystals of dendrites increase in size by adding more atoms until growth is limited by other dendrites growing in the molten material or the dendrites encounter the liquid at a temperature above the local melting point temperature.

Solidification during additive manufacturing often involves uneven dendritic growth that causes the layer of metallic material to have an unbalanced grain structure. Particularly, energetically favorable crystallographic directions, the underlying substrate or prior layer, impurities, directional use of heat source (e.g., laser) as well as other factors can cause some dendrites to exhibit more rapid growth than others during solidification. The dendrites that dominate growth often result in elongated grains that have columnar orientations. These elongated, columnar grains are long, thin, coarse grains that can arise, such as in situations when the metallic material solidifies rather slowly in the presence of a steep temperature gradient. The predominant dendrites also prevent adjacent dendrites growing at other orientations from experiencing the same amount of growth.

As discussed above, a deposited layer of metallic material transitions back from a molten state to a solid state via solidification. Unbalanced nucleation and growth during solidification might cause the metallic material layer to have anisotropic properties. Particularly, epitaxial growth and other factors can cause the grain microstructure of the metallic material to have elongated, columnar grains that negatively impact the strength and other properties of the layer. Further, since additive manufacturing involves generating layers upon layers to create a desired structure, the effects of the impact are compounded and negatively influence the performance and effectiveness of the structure.

In order to improve the durability, strength, and other properties of layers of metallic material, example techniques presented herein refine the microstructures of the layers during additive manufacturing. Particularly, some examples involve applying one or multiple electromagnetic fields upon portions of a deposited metallic material layer when the material is in the molten state. The application of electromagnetic fields stirs and perturbs the molten material causing new nucleation sites to form at various locations within the molten material (e.g., at the solid-liquid interface). As a result, these nucleation sites can grow new crystals during when the molten material undergoes solidification. The new crystals are arranged at spatially-random orientations within the metallic material causing the refined microstructure of the layer to smaller, equiaxed grains that are randomly oriented. This refined microstructure provides improvements to strength, ductility, fatigue durability, strain rate, and resistance to creep deformation among other properties.

Additional examples involve applying vibration to deposited layers of metallic material during additive manufacturing to refine the microstructure of the layers. The vibration can perturb or otherwise modify a layer of metallic material when the material is in a molten state. For instance, after a layer of metallic material is initially heated and shaped, vibration can be applied to stir the portions of the material that are in a melt pool state. The vibration can cause a relative shear motion of molten material relative to nucleating solids of an underlying substrate that the layer is positioned upon. As a result, dendrites growing in the molten material undergo defragmentation. During defragmentation, portions of dendrites fracture and detach. These portions that detach from the original dendrites can form new nucleation sites in the molten material. For example, some of the detached dendrite portions can attach and nucleate at the solid-liquid interface of the molten material. The nucleation sites subsequently grow crystals at spatially-random orientations, resulting in the vibrated layer having a more balanced grain structure that provides improvements to strength, ductility, fatigue durability, strain rate, and resistance to creep deformation among other properties.

In some examples, a combination of vibration and electromagnetic field techniques are used to restructure the microstructure of deposited layers of metallic materials. Both techniques can be applied to a layer simultaneously or in a given order. For instance, an example can involve a molten layer of material receiving vibration, then electromagnetic fields, and more vibration during the deposition process. The techniques can be utilized for various durations and intensities as well. Further, some examples involve switching between vibration and electromagnetic field techniques for different layers during additive manufacturing.

The above techniques as well as similar processes can reduce or potentially eliminate the need for other stress relieving processes during additive manufacturing. In turn, overall cost and flow time is often reduced by eliminating process steps. In addition, unlike the rolling wheel technique, electromagnetic fields and vibration techniques do not place limits on the geometrical designs of a structure for additive manufacturing. For instance, the techniques can be used quickly on desired structures that are small in size (e.g., centimeters in measurements) and can be used on all layers (or a subset of layers) of the desired structure during additive manufacturing. Further, in some examples, the electromagnetic field and vibration techniques can both use setups that require fewer components than the rolling wheel technique. The strain-free grains that originate from newly formed nucleation sites typically have similar sizes and morphologies unlike the elongated grains that they are replacing. The replacement grains also tend to have spatially-random orientations causing the layer to have more isotropic properties rather than anisotropic. Isotropic properties indicates that the properties of the layer are consistent regardless the direction of measurement.

In order to improve the properties of an additively manufactured structure, in some examples, the above techniques can be applied to all layers (or a subset of layers) during additive manufacturing. The outcome produces a strengthened structure that is less susceptible to tensile stress. Tensile stress represents the resistance of a structure to a force attempting to pull apart or stretch the structure and indicates the overall strength of the materials that make up the structure. As such, refining microstructure through vibration and/or electromagnetic field techniques can produce layers and overall additively manufactured structures made out of metallic materials less susceptible to tensile stress and other material defects.

Referring now to the Figures, FIG. 1 shows a flowchart of an example method for refining the microstructure of a material used for additive manufacturing. Method 100 shown in FIG. 1 presents an example of a method that could be used to refine the microstructure of one or more materials used during additive manufacturing.

Method 100 can include one or more operations, functions, or actions as illustrated by one or more of blocks 102, 104, and 106. Although the blocks are illustrated in a sequential order, these blocks can also be performed in parallel, and/or in a different order than those described herein. Also, the various blocks can be combined into fewer blocks, divided into additional blocks, and/or removed based upon the desired implementation.

At block 102, the method 100 involves generating a first layer of an integral object using a metallic material. An integral object is a structure with one or multiple components formed together as a single-piece. For instance, an integral object can be an additively manufactured structure that serves as a component of a larger structure. In other examples, an integral object can be standalone object. Other examples of integral objects are possible. Further, unlike traditional manufacturing, additively manufactured objects do not require fasteners (e.g., screws, nails) to have multiple elements connected or joined together. As a result, the layer and consolidation process of additive manufacturing enables production of a wide array of integral objects with various shapes and designs.

As indicated above, additive manufacturing involves heating and depositing layers of one or multiple metallic materials together to form a desired integral object according to a 3D data model. Example metallic materials that can be used include, but are not limited to, titanium, gold, silver, steel, aluminum, and alloys. In some instances, compounds of materials can also be used. For instance, a compound can include a metal and a non-metal combined together. The materials selected for an additively manufactured object typically depend on the cost of materials and the dimensions and desired use of the object.

During the deposition of a layer, a metallic material is heated and shaped. For example, some materials, such as titanium alloys have melting ranges between 1600-1660° C. The material (e.g., molten alloy) is locally heated well above this temperature by the incident energy, typically a laser or electron beam, and momentarily to 3,000-4,000° C., before it cools and solidifies. For instance, in powder feed additive manufacturing processes, powder layers are consolidated layer by layer using a focused heat source (e.g., laser). This enables a component to be generated directly from a computer aided design (CAD) data. In other examples, other types of additive manufacturing techniques are used. For instance, an example can involve using a wire feed additive manufacturing process.

In some instances, the first layer is generated by heating the metallic material to a molten state such that the metallic material includes a solid-liquid interface. To form portions of the structure, the material or materials selected for the first layer (and additional layers) are configurable to couple to subsequent layers with the layers blended together create a seamless end structure.

After the metallic material is heated into the molten state, the temperature of the material decreases. When the metallic material decreases in temperature below its melting temperature, solidification occurs. The molten material loses heat as the time since the material was initially heated passes. During solidification, atoms from the molten material bond together (e.g., metallic bonds) and start to form tiny seed crystals microscopic in size (e.g., less than 1 millimeter). After a tiny seed crystal starts to grow, the crystal can be described as a nucleus growing from a nucleation site. As such, solidification involves multiple crystals growing in the form of dendrites in the molten material. Various factors, such as the underlying substrate or prior layer, impurities, directional nature of the applied heat source, etc., can result in unbalanced growth of dendrites of crystals with some dendrites dominating growth causing the layer to have more anisotropic properties. The anisotropic properties cause the metallic material to differ depending on direction of measurement with some portions of the metallic material having more strength than others portions.

At block 104, the method 100 involves applying an electromagnetic field to the metallic material of the first layer. After depositing the first layer of metallic material, the layer can have anisotropic properties as a result of epitaxial growth of dendrites producing elongated grains. In order to reduce anisotropic properties, one or multiple electromagnetic fields are applied to portions of the metallic material in the molten state. The electromagnetic fields perturb the metallic material causing new nucleation sites to form in the molten material. For instance, numerous nucleation sites can originate at the solid-liquid interface of the molten material.

The application of electromagnetic fields can involve using various types of electrical sources. For instance, an example source can utilize power from a wall-outlet or battery to apply electromagnetic fields upon the first layer as well as other deposited layers during additive manufacturing. In addition, the method of application and duration can vary within examples. Electromagnetic fields are applied upon a layer of molten material for a threshold duration of time that depends on the type and quantity of material making up the layer. For instance, some examples can involve applying electromagnetic fields for a few seconds (e.g., 5-10 seconds) or longer (e.g., 30 seconds). In further examples, electromagnetic fields are applied for longer durations (e.g., 2 minutes, 5 minutes). The threshold duration can depend on various factors, such as the thickness and other dimensions of the layer of metallic material as well as the type of metallic material.

At block 106, the method 100 involves generating a second layer coupled to the first layer of the integral object. In order to produce the integral object, additional layers are deposited until the structure of the integral object is completely formed. The additional layers can be formed from the same material or different material from prior layers. In addition, the second layer and other subsequent layers can have the same dimensions (e.g., thickness) or different dimensions depending on the formation of the desired structure.

Generating a second layer coupled to the first layer of the integral object can increase a number of nucleation sites in the molten material of the first layer. The heat and presence of the second layer can impact the nucleation and growth of the first layer. For instance, the presence of the second layer on top of the nearly solidified first layer can cause heterogeneous nucleation to occur relative to the coupling point between the layers.

As discussed above, these nucleation sites can grow crystals at spatially-random orientations. When dendrites of crystals can no longer grow due to limits placed by other dendrites growing within the layer, the arrangement of these crystals form the refined grain microstructure of the metallic material. Particularly, this refined microstructure is made up of smaller, equiaxed grains that have random orientations unlike columnar, elongated grains. As result, the layer has increased isotropic properties improving its overall strength, ductility, and other properties.

FIG. 2 shows a flowchart of an example method for use with the method 100, according to an example implementation. At block 108, functions include applying vibration to the metallic material of the first layer. Vibrating a deposited layer of molten material causes a relative shear motion of the molten material against nucleating solids on an underlying substrate that the layer is positioned on. As a result, dendrites growing in molten material can undergo defragmentation where portions of dendrites fracture and detach. These detached portions can reposition in the molten material and form nucleation sites that subsequently grow new crystals at spatially-random orientations during solidification. The growth of these crystals causes the refined microstructure of the solidified layer of material to have a balanced arrangement of smaller grains that improve properties of the layer.

The amount of vibration (e.g., amplitude, duration) can vary within examples. For instance, vibration techniques can involve both sonic and ultrasonic application approaches applied in either a periodic or continuous manner during deposition of a given layer. In some examples, sonic vibration ranges can range between 100 to 400 Hertz and ultrasonic vibration ranges can range between 20 to 45 Megahertz. The sonic and ultrasonic vibration ranges can depend on the source providing the vibration. As such, the sonic vibration and/or ultrasonic vibration can direct energy towards a deposited layer of metallic material. For instance, the energy can perturb molten metallic material after deposition during additive manufacturing. Other high frequency mechanical impact processes can be used within examples.

In some examples, applying vibration to the metallic material of the first layer is performed in parallel with applying the electromagnetic field to the metallic material of the first layer. As an example, during an additive manufacturing process, each deposited layer of molten material can receive vibration while also receiving electromagnetic fields to improve properties. In other examples, vibration is applied to the substrate prior to applying the electromagnetic field to the metallic material of the first layer. Further, in some instances, vibration is applied to a layer of molten material after the layer is modified by one or multiple electromagnetic fields.

FIG. 3 shows a flowchart of an example method for use with the method 100, according to an example implementation. At block 110, functions include applying a cooling gas flow to the metallic material of the first layer. During additive manufacturing, a cooling gas or other temperature reduction techniques can be used to cool a deposited layer of material. For instance, a cooling technique can be used to undercool a layer of molten material to cause the layer to undergo solidification. The cooling gas or another temperature reduction technique can be used to reduce an amount of time available for dendrites of the metallic material to grow. For instance, the application of cooling gas can occur after depositing the metallic material as a layer to limit a subset of dendrites from dominating growth due to epitaxial growth. In other examples, cooling gas or another temperature reduction technique is applied before or after one or multiple vibration and/or electromagnetic field techniques are applied to a given layer of metallic material.

FIG. 4 shows a flowchart of an example method for use with the method 100, according to an example implementation. At block 112, functions include applying an electromagnetic field to a metallic material of the second layer. Similar to the generation of the first layer, electromagnetic fields can also be applied to the second layer to promote restructuring of the microstructure of the second layer of metallic material. The application of electromagnetic fields can differ across different layers during additive manufacturing. For instance, the duration, amount, quantity, and other factors of applying electromagnetic fields can differ for each layer.

At block 114, functions include generating a third layer of the integral object. As indicated above, additive manufacturing generates the integral object by consolidating multiple layers of material. As such, in order to form and complete the integral object, additional layers are deposited on top of prior layers until the integral object is complete. The quantities, sizes, and forms of additional layers depend on the dimensions and design of the integral object. Particularly, some layers can have more or less material in different shapes depending on the design of the integral object.

To ensure the additional layers maintain similar refined microstructures, electromagnetic fields and/or vibration techniques are similarly applied to these layers. The techniques used can remain the same or differ between layers. For instance, an example can involve alternating between applying electromagnetic fields to some layers and applying vibration to other layers.

FIG. 5 is an illustration of an apparatus 116 generated using microstructure refinement techniques during additive manufacturing. The apparatus 116 involves an integral object 118 made up of one or multiple interconnected components generated and blended together during additive manufacturing. As shown, the integral object 118 is made up of a first layer 120, a second layer 122, a third layer 124, a fourth layer 126, and a fifth layer 128. Other additively manufactured integral objects can have more or fewer layers shaped in other configurations.

The apparatus 116 represents an additively manufactured vase configured to hold and display flowers. The method 100 shown in FIGS. 1-4 or another additive manufacturing technique can create apparatus 116. Each deposited layer (i.e., the layers 120-128) is shown with noticeable borders for illustration purposes to depict the layout of the different layers 120-128. The layers 120-128 can consist of various metallic materials, such as aluminum, titanium, alloys, etc. In addition, the height and width of the layers 120-128 are exaggerated in FIG. 5 for illustration purposes, but can be smaller within implementations.

When additively manufacturing the apparatus 116, each layer of the integral object 118 can be strengthened using one or multiple techniques discussed above before depositing the next layer. For instance, generation of the apparatus 116 initially involves depositing and forming the first layer 120 on a substrate. Epitaxial growth relative to the substrate can cause unbalanced dendrite growth that impacts the properties of the first layer 120. The substrate can serve as a platform for holding layers during additive manufacturing.

After depositing the first layer 120, one or multiple electromagnetic fields can be applied to the molten material of the first layer 120. Similarly, vibration techniques can also be used to help restructure the microstructure of the metallic material making up the first layer 120. As discussed above, these techniques can cause restructuring by creating new nucleation sites that grow crystals at spatially-random orientations.

After the first layer 120 is prepared during additive manufacturing, the second layer 122 is deposited on the first layer 120 to form a portion of the integral object 118. In some instances, the second layer 122 is deposited immediately after the first layer 120 receives electromagnetic fields and/or vibration. In other cases, the first layer 120 is allowed to cool off and release some energy before the second layer 122 is deposited. The second layer 122 can be deposited directly onto the first layer 120, for example.

The above process involving electromagnetic fields and/or vibration techniques is repeated to strengthen layers as the additional layers (e.g., the third layer 124, the fourth layer 126, and the fifth layer 128) are deposited. This repetition across multiple layers improves the overall strength of the apparatus 116 and can ensure that adding water and flowers does not weaken the integral object 118.

Figure 6:
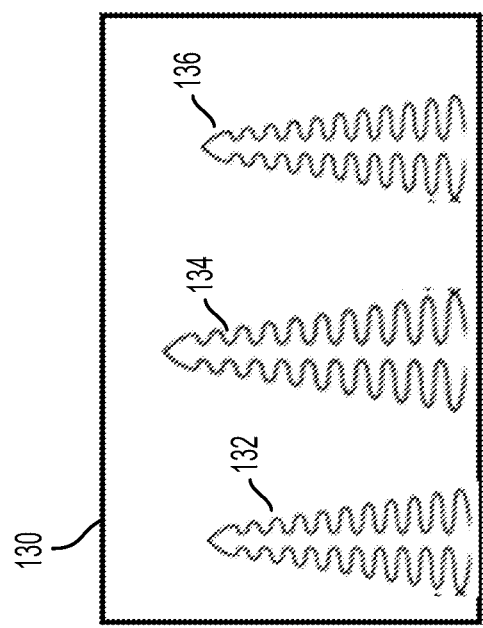
FIG. 6 is an illustration of dendritic growth of a metallic material, according to an example implementation.

FIG. 6 is an illustration of dendritic growth of a metallic material. Frame 130 shows dendrites 132, 134, 136 growing to illustrate dendritic growth of a metallic material. As discussed above, a dendrite is a crystal mass with a branching, treelike structure. Frame 130 shows dendrite 132 and dendrite 136 having similar sizes with dendrite 134 having a slightly larger size comparatively. In some instances, the larger size of dendrite 134 can indicate that dendrite 134 is dominating growth impacting the growth of dendrites 132, 136. As a result, dendrite 134 can grow into an elongated grain. In other examples, frame 130 can represent a situation involving multiple dendrites 132-136 dominating growth in a manner that likely causes a layer of metallic material to have more anisotropic properties due to elongated grains.

Figure 7:
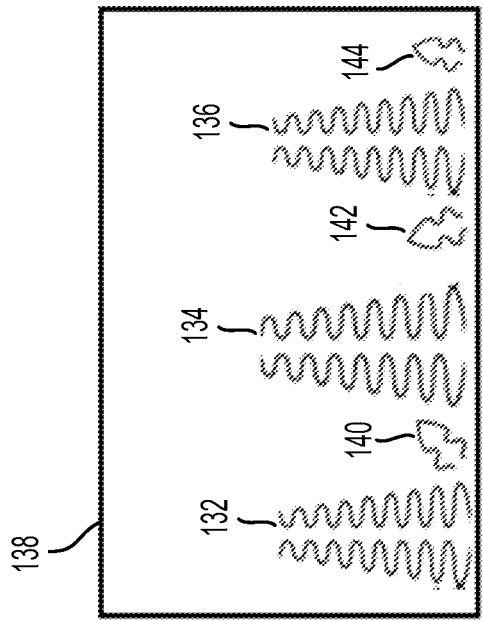
FIG. 7 is an illustration of modified dendritic growth of the metallic material shown in FIG. 6, according to an example implementation.

FIG. 7 is an illustration of modified dendritic growth of the metallic material shown in FIG. 6. Particularly, frame 138 shows dendrites 132, 134, 136 in partially fractured and missing portions after an application one or more microstructure restructuring techniques, such as electromagnetic fields or vibration techniques described above. As a result, portions of the dendrites formed new nucleation sites 140, 142, and 144. These nucleation sites 140, 142, 144 can grow crystals that result in additional grains balancing the overall microstructure of the metallic material.

Figure 8:
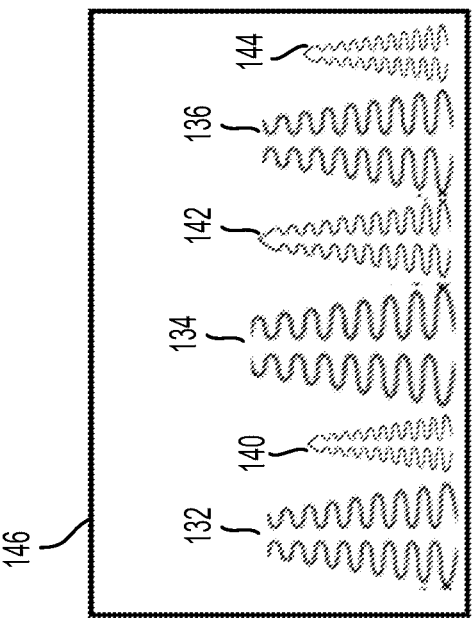
FIG. 8 is an illustration of subsequent dendritic growth of the metallic material shown in FIGS. 6 and 7, according to an example implementation.

FIG. 8 is an illustration of subsequent dendritic growth of the metallic material shown in FIGS. 6 and 7. Frame 146 represents a subsequent time after frame 138 when nucleation sites 140, 142, and 144 grow and produce dendrites that have similar sizes to original dendrites 132, 134, and 136. As shown, the dendrites 132, 134, 136 and nucleation sites 140, 142, 144 can cause a restructuring of the microstructure of the metallic material. Each dendrite can produce one or multiple crystals are spatially-random orientations that grown until reaching a threshold limit of growth imposed by other dendrites. The resulting refined microstructure includes equiaxed grains that have spatially-random orientations.

Figure 9:
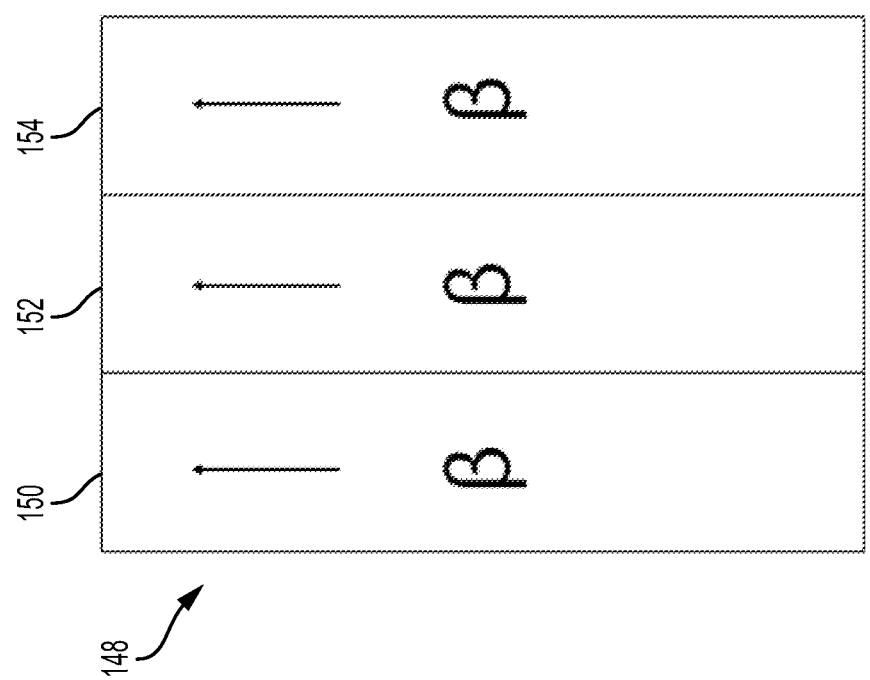
FIG. 9 is an illustration of elongated grains that make up part of the microstructure of a deposited layer.

FIG. 9 is an illustration of elongated grains that make up part of the microstructure of a deposited layer. The portion 148 of the deposited layer shown in FIG. 9 includes an elongated grain 150, an elongated grain 152, and an elongated grain 154 arranged in columnar orientations. After a layer is deposited during additive manufacturing, epitaxial growth causes some dendrites to dominate growth resulting in elongated grains 150-154. As shown in FIG. 9, these elongated grains 150-154 often form together in a particular orientation that causes the deposited layer to have more anisotropic properties likely negatively impacting strength, durability, and other properties. The growth of some dendrites producing these elongated grains 150-154 also prevents other dendrites at different orientations in the layer from experiencing similar growth. For these reasons, electromagnetic field and/or vibration techniques can be used during additive manufacturing to deform and allow restructuring of the grain microstructure to reduce the anisotropic properties.

Figure 10:
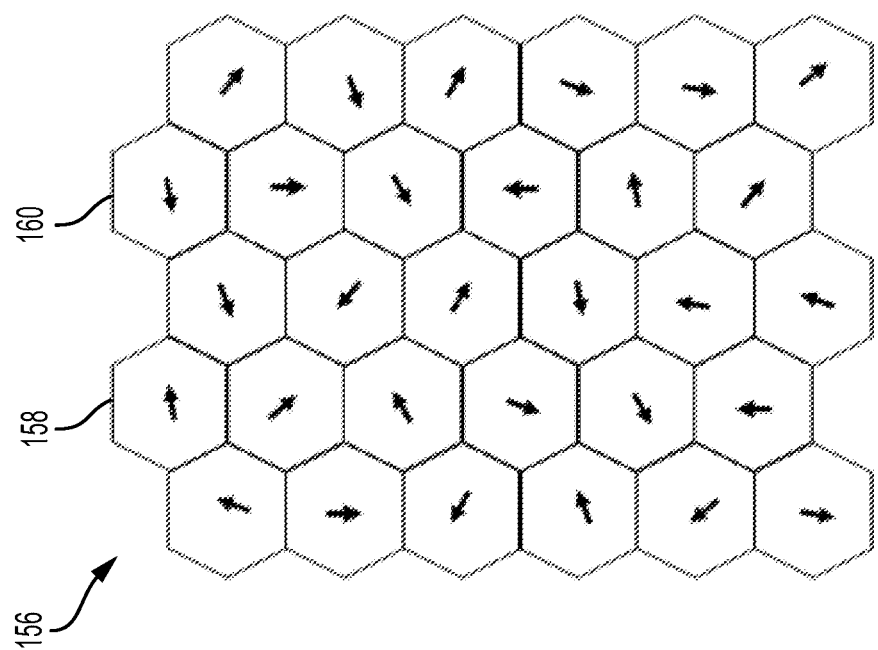
FIG. 10 is an illustration of refined grains that make up part of the microstructure of the deposited layer shown in FIG. 9.

FIG. 10 is an illustration of refined grains that make up part of the microstructure of the deposited layer shown in FIG. 9. In particular, the portion 156 represents the deposited layer described in FIG. 9 after the layer undergoes one or multiple techniques involving electromagnetic fields and vibration. As shown, the portion 156 includes smaller grains (e.g., grains 158, 16) having spatially-random orientations. These rounded, smaller grains replace the elongated grains 150-154 shown in FIG. 9 increasing the strength of the layer. As a result, the strengthen layer allows for an additively manufactured structure with more isotropic properties that can improve the use and durability of the structure.

Figure 11:
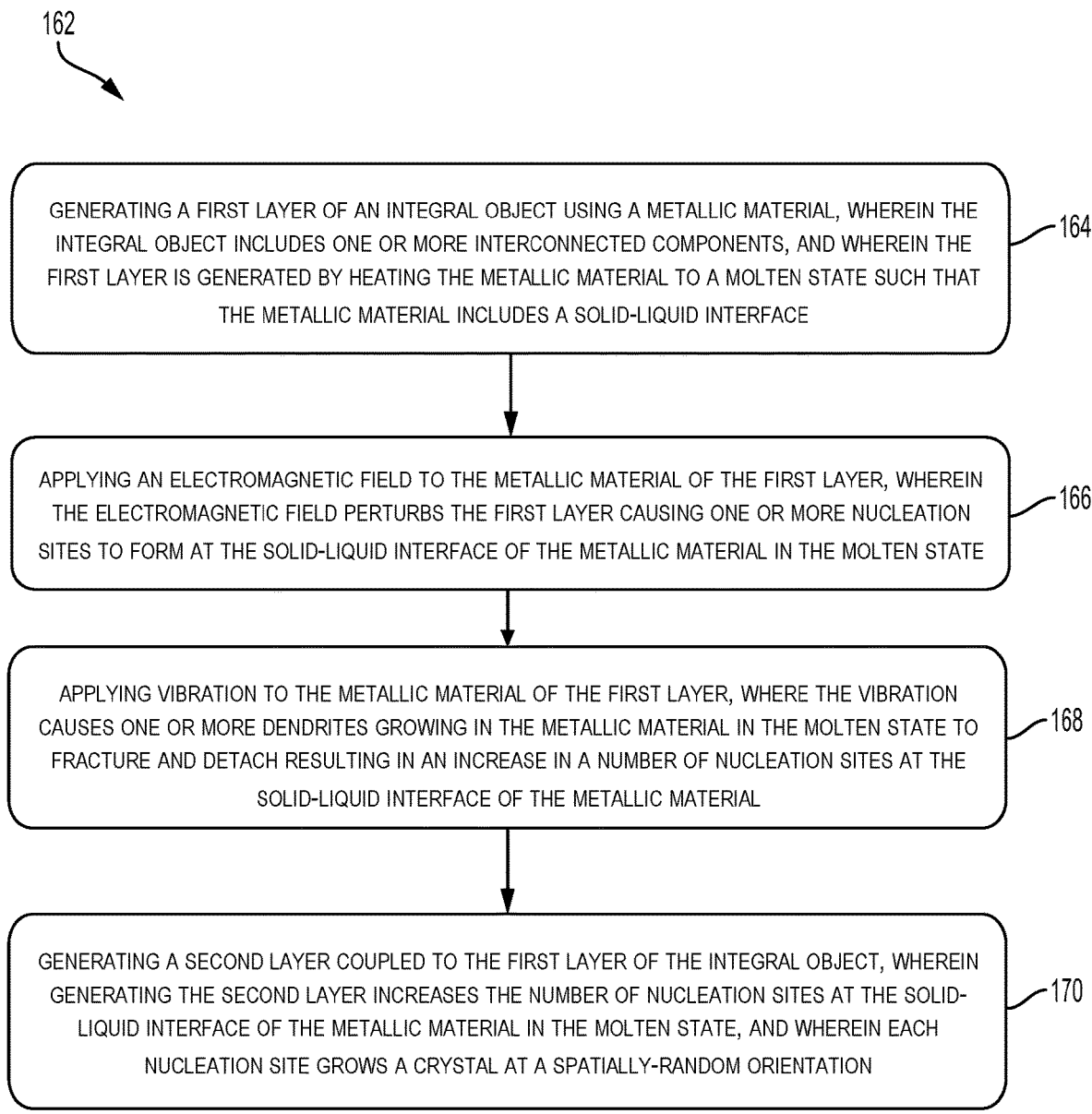
FIG. 11 shows a flowchart of an example method for refining the microstructure of a metallic metal used for additive manufacturing, according to an example implementation.

FIG. 11 shows a flowchart of an example method for refining the microstructure of a metal used for additive manufacturing. Method 162 shown in FIG. 11 presents another example of a method that could be used to refine the microstructure of a metal or another material used during additive manufacturing.

Method 162 can include one or more operations, functions, or actions as illustrated by one or more of blocks 164, 166, 168, and 170. Although the blocks are illustrated in a sequential order, these blocks can also be performed in parallel, and/or in a different order than those described herein. Also, the various blocks can be combined into fewer blocks, divided into additional blocks, and/or removed based upon the desired implementation.

At block 164, the method 162 involves generating a first layer of an integral object using a metallic material. Particularly, the first layer is deposited using a metal (e.g., titanium, aluminum) or metallic alloy that grows such that a set of dendrites dominate the overall growth producing elongated grains. For instance, the elongated grains can align in columnar orientations. A few dendrites dominating growth can prevent other dendrites in opposing orientations from growing as much. As a result, the deposited layer of metal can have anisotropic properties.

At block 166, the method 162 involves applying an electromagnetic field to the metallic material of the first layer. The application of one or more electromagnetic fields perturbs the first layer of metallic material causing one or multiple nucleation sites to form in the molten material. For instance, the nucleation sites can form at the solid-liquid interface of the molten material.

At block 168, the method 162 involves applying vibration to the metallic material of the first layer. Similar to electromagnetic fields, vibration can perturb molten material during additive manufacturing. Particularly, vibration can cause one or multiple dendrites growing in the metallic material in the molten state to fracture and detach. The portions that detach from the original dendrites can form nucleation sites within the molten material. In some instances, vibration increases in a number of nucleation sites at the solid-liquid interface of the metallic material.

In some examples, applying vibration to the metallic material of the first layer is performed in parallel with applying the electromagnetic field to the metallic material of the first layer. In other examples, vibration is applied to the metallic material before and/or after electromagnetic fields is applied to the layer.

At block 170, the method 162 involves generating a second layer of the integral object coupled to the first layer of the integral object. In particular, generating the second layer increases the number of nucleation sites at the solid-liquid interface of the metallic material in the molten state. As such, each nucleation site can grow a crystal at a spatially-random orientation. With multiple nucleation sites growing crystals that form new grains. The resulting refined microstructure of the metallic material is made up of new grains that have equiaxed grain structures that can cause the first layer to have more isotropic properties. The new grains can have similar sizes and random orientations that modify the properties of the layer of material.

By the term "substantially" or "about" used herein, it is meant that the recited characteristic, parameter, or value need not be achieved exactly, but that deviations or variations, including for example, measurement error, measurement accuracy limitations and other factors known to a person having ordinary skill in the art, can occur in amounts that do not preclude and/or occlude the effect the characteristic was intended to provide.

The description of the different advantageous arrangements has been presented for the purposes of illustration and description, and is not intended to be exhaustive or limited to the examples in the disclosed form. Many modifications and variations will be apparent to those of ordinary skill in the art. Further, different advantageous examples can describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. An additive manufacturing system for generating an integral object having one or more interconnected components, wherein the additive manufacturing system is configured to perform operations comprising:
   generating a first layer of the integral object using a metallic material, wherein the first layer is generated by:
      heating, via a heat source, the metallic material to a molten state such that the metallic material includes a solid-liquid interface, and
      applying, via an electrical source, an electromagnetic field to perturb the first layer for a threshold duration of time, wherein the electromagnetic field causes one or more nucleation sites to form at the solid-liquid interface of the metallic material in the molten state, and wherein the threshold duration of time depends on both a type of the metallic material and a thickness of the first layer; and
   generating a second layer on the first layer of the integral object, wherein generating the second layer increases a number of the nucleation sites at the solid-liquid interface of the metallic material in the molten state, and wherein each nucleation site grows a crystal at a spatially-random orientation.

2. The additive manufacturing system of claim 1, wherein the operations further comprise:
applying vibration to the first layer to stir the metallic material in the molten state, wherein the vibration causes one or more dendrites growing in the metallic material in the molten state to fracture and detach resulting in an increase in a number of nucleation sites at the solid-liquid interface of the metallic material.

3. The additive manufacturing system of claim 2, wherein the vibration is applied to the first layer in parallel with an application of the electromagnetic field to perturb the first layer.

4. The additive manufacturing system of claim 2, wherein the vibration is applied to the first layer after the electromagnetic field is applied to the first layer.

5. The additive manufacturing system of claim 1, wherein the operations further comprise:
applying a first round of vibration to the first layer before applying the electromagnetic field to the first layer; and
applying a second round of vibration to the first layer after applying the electromagnetic field to the first layer.

6. The additive manufacturing system of claim 1, wherein a structure of the integral object is based on a three-dimensional (3D) data model.

7. The additive manufacturing system of claim 1, wherein the metallic material of the first layer is a first type of metallic material and wherein the second layer comprises a second type of metallic material.

8. The additive manufacturing system of claim 1, wherein a structure of the integral object is based on a computer aided design (CAD).

9. The additive manufacturing system of claim 1, wherein the operations further comprise:
generating a third layer coupled to the second layer; and
generating a fourth layer coupled to the third layer.

10. The additive manufacturing system of claim 1, wherein the metallic material includes aluminum or titanium.

11. The additive manufacturing system of claim 1, wherein the metallic material comprises one or more alloys.

12. The additive manufacturing system of claim 1, wherein the integral object corresponds to an aviation component.

13. The additive manufacturing system of claim 1, wherein the operations further comprise:
cooling the first layer via a cooling gas prior to an addition of the second layer.

14. A system comprising:
a heat source;
an electrical source; and
an additive manufacturing device configured to:
generate a first layer of an integral object using a metallic material, wherein the first layer is generated by:
heating, via the heat source, the metallic material to a molten state such that the metallic material includes a solid-liquid interface, and
applying, via the electrical source, an electromagnetic field to perturb the first layer for a threshold duration of time, wherein the electromagnetic field causes one or more nucleation sites to form at the solid-liquid interface of the metallic material in the molten state, and wherein the threshold duration of time depends on both a type of the metallic material and a thickness of the first layer; and
generate a second layer on the first layer of the integral object, wherein generating the second layer increases a number of the nucleation sites at the solid-liquid interface of the metallic material in the molten state, and wherein each nucleation site grows a crystal at a spatially-random orientation.

15. The system of claim 14, wherein a structure of the integral object is based on a three-dimensional (3D) data model.

16. The system of claim 14, wherein the metallic material of the first layer is a first type of metallic material and wherein the second layer comprises a second type of metallic material.

17. The system of claim 14, wherein the integral object is an aviation component.

18. The system of claim 14, wherein the additive manufacturing device is further configured to:
generate a structure of the integral object is based on a computer aided design (CAD).

19. The system of claim 14, wherein the additive manufacturing device is further configured to:
generate the first layer using a wire feed.

20. The system of claim 14, wherein the additive manufacturing device is further configured to:
generate the first layer using a powder feed.

* * * * *